United States Patent
Bulson et al.

(10) Patent No.: US 8,762,993 B2
(45) Date of Patent: Jun. 24, 2014

(54) METHOD, SYSTEM AND PROGRAM PRODUCT FOR CAPTURING CENTRAL PROCESSING UNIT (CPU) UTILIZATION FOR A VIRTUAL MACHINE

(75) Inventors: Sandra Bulson, Hopewell Junction, NY (US); Virginia P. Goldsmith, Poughkeepsie, NY (US); Bruce J. Hayden, Endicott, NY (US); Moon J. Kim, Wappingers Falls, NY (US); Colm Malone, New York, NY (US); Dikran Meliksetian, Danbury, CT (US); Scott F. Rohling, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/452,135

(22) Filed: Apr. 20, 2012

(65) Prior Publication Data

US 2012/0204177 A1    Aug. 9, 2012

Related U.S. Application Data

(63) Continuation of application No. 11/189,364, filed on Jul. 26, 2005, now Pat. No. 8,230,419.

(51) Int. Cl.
*G06F 9/455*  (2006.01)
*G06F 9/46*  (2006.01)

(52) U.S. Cl.
CPC .................................. *G06F 9/45533* (2013.01)
USPC .............................................. 718/1; 718/102

(58) Field of Classification Search
CPC ........................... G06F 9/45533; G06F 9/4843
USPC ..................................................... 718/1, 102
See application file for complete search history.

(56) References Cited

U.S. PATENT DOCUMENTS

| | | |
|---|---|---|
| 5,201,049 A | 4/1993 | Shorter |
| 5,339,392 A | 8/1994 | Risberg et al. |
| 6,496,847 B1 | 12/2002 | Bugnion et al. |
| 6,574,587 B2 | 6/2003 | Waclawski |

(Continued)

FOREIGN PATENT DOCUMENTS

JP    64-059438    3/1989

OTHER PUBLICATIONS

Kumabe, Office Action Communication for U.S. Appl. No. 11/189,364 dated Jan. 25, 2010, 22 pages.

(Continued)

*Primary Examiner* — Meng An
*Assistant Examiner* — Blake Kumabe
(74) *Attorney, Agent, or Firm* — Lisa Ulrich; Hoffman Warnick LLC

(57) ABSTRACT

The present invention allows CPU utilization for a virtual machine (VM) to be captured from a perspective of a host. Specifically, under the present invention, a work request having a set (e.g., one or more) of jobs is received by a host and allocated to a virtual machine on a node. The work request is typically accompanied by an account identifier such as a multi-value billing code. Once the work request is allocated to a particular VM on the node, a "startacct" script is issued, and a first account record is created. Thereafter, the work request is processed and the CPU utilization needed to complete the set of jobs is monitored. Once the set of jobs is completed, an "endacct" script is issued and a second account record is created. Among other things, the second account record includes the monitored CPU utilization and the account identifier.

17 Claims, 4 Drawing Sheets

(56) References Cited

U.S. PATENT DOCUMENTS

| | | |
|---|---|---|
| 7,191,440 B2 | 3/2007 | Cota-Robles et al. |
| 7,526,452 B2 | 4/2009 | Agarwal et al. |
| 7,698,705 B1 | 4/2010 | Czajkowski et al. |
| 2001/0054066 A1 | 12/2001 | Spitzer |
| 2002/0013802 A1 | 1/2002 | Mori et al. |
| 2002/0129082 A1 | 9/2002 | Baskey et al. |
| 2003/0069972 A1 | 4/2003 | Yoshimura et al. |
| 2004/0068560 A1 | 4/2004 | Oulu et al. |
| 2004/0168170 A1 | 8/2004 | Miller |
| 2004/0194090 A1 | 9/2004 | Kelly et al. |
| 2005/0004879 A1 | 1/2005 | Mathias et al. |
| 2005/0044228 A1 | 2/2005 | Birkestrand et al. |
| 2005/0055429 A1 | 3/2005 | Abele et al. |
| 2005/0120160 A1 | 6/2005 | Plouffe et al. |
| 2006/0200819 A1 | 9/2006 | Cherkasova et al. |

OTHER PUBLICATIONS

Kumabe, Office Action Communication for U.S. Appl. No. 11/189,364 dated Jun. 24, 2010, 15 pages.

Kumabe, Office Action Communication for U.S. Appl. No. 11/189,364 dated Dec. 1, 2010, 16 pages.

Kumabe, Office Action Communication for U.S. Appl. No. 11/189,364 dated Apr. 25, 2011, 17 pages.

Kumabe, Office Action Communication for U.S. Appl. No. 11/189,364 dated Jul. 20, 2011, 22 pages.

Kumabe, Notice of Allowance and Fee(s) Due for U.S. Appl. No. 11/189,364 dated Mar. 19, 2012, 15 pages.

Running VMware ESX Server, "Using SNMP with ESX Server," 2002, pp. 125-126, version 1.5, www.vmware.com.

| USER ID | ACCOUNT ID | DATE/TIME | CPU UTILIZATION | TYPE |
|---------|------------|--------------|-----------------|------|
| LINUX1  | DEFAULT    | 112504080022 | 0004016         | 01   |
| LINUX1  | DBGROUP    | 112504080130 | 6345036         | C1   |
| LINUX1  | DEFAULT    | 112504080022 | 0002303         | 01   |
| LINUX1  | DBGROUP    | 112504080130 | 4322024         | C1   |

FIG. 2

METHOD, SYSTEM AND PROGRAM PRODUCT FOR CAPTURING CENTRAL PROCESSING UNIT (CPU) UTILIZATION FOR A VIRTUAL MACHINE

CROSS-REFERENCE TO RELATED APPLICATIONS

This application is a continuation of currently pending U.S. patent application Ser. No. 11/189,364 filed on Jul. 26, 2005. The application identified above is incorporated herein by reference in its entirety for all that it contains in order to provide continuity of disclosure.

FIELD OF THE INVENTION

In general, the present invention relates to capturing Central Processing Unit (CPU) utilization. Specifically, the present invention allows CPU utilization for a virtual machine to be captured in real-time from a perspective of a host.

BACKGROUND OF THE INVENTION

In recent years, grid computing has become increasingly popular. In a grid computing environment, multiple users or customers can take advantage of a computer infrastructure that is geographically distributed and redundant. In one implementation, a grid computing environment can include a host that communicates with one or more nodes, each of which can have one or more virtual machines. As a work request is received by the host (e.g., from a customer), it will be allocated to a particular node and then processed by a particular virtual machine. However, as grid computing becomes more popular, various challenges are faced. One such challenge involves the monitoring of grid resource utilization needs and the capturing of resource usage data. Along these lines, it is of particular importance (e.g., for a particular customer or a project) for the amount of CPU utilization expended in processing work loads to be determined. Specifically, if a particular customer utilizes the grid infrastructure for a set of tasks or jobs, the resulting resource usage of the grid infrastructure should be accurately accounted and attributed to the customer.

Heretofore, no existing system provides a way to determine the amount of actual CPU utilized from the perspective of the host. For purposes of measurement for performance as well as for billing, it is desirable to be able to measure a piece of work executed on a virtual machine from the perspective of the host.

SUMMARY OF THE INVENTION

In general, the present invention provides a method, system and program product for capturing CPU utilization for a virtual machine (VM) from a perspective of a host. Specifically, under the present invention, a work request having a set (e.g., one or more) of jobs is received by a host and allocated to a virtual machine on a node. The work request is typically accompanied by an account identifier such as a multi-value billing code. Once the work request is allocated to a particular VM on the node, a "startacct" script is issued, and a first account record is created. Thereafter, the work request is processed and the CPU utilization needed to complete the set of jobs is monitored. Once the set of jobs is completed, an "endacct" script is issued and a second account record is created. Among other things, the second account record includes the monitored CPU utilization and the account identifier accompanying the work request.

A first aspect of the present invention provides a method for capturing Central Processing Unit (CPU) utilization for a virtual machine, comprising: receiving a work request having a set of jobs in the virtual machine from a host, wherein the work request is accompanied by an account identifier; creating a first account record for the work request; processing the work request in the virtual machine to complete the set of jobs; and creating a second account record for the work request in response to completion of the set of jobs, wherein the second account record indicates the CPU utilization for the virtual machine to process the work request.

A second aspect of the present invention provides a method for capturing Central Processing Unit (CPU) utilization for a virtual machine, comprising: issuing a first script in response to a work request having a set of jobs received by the virtual machine from a host; creating a first account record for the work request in response to the first script; issuing a second script in response to completion of the set of jobs in the virtual machine; and creating a second account record for the work request in response to the second script, wherein the second account record indicates the CPU utilization for the virtual machine to complete the set of jobs.

A third aspect of the present invention provides a system for capturing Central Processing Unit (CPU) utilization for a virtual machine, comprising: a system for creating a first account record for a work request having a set of jobs received by the virtual machine from a host, wherein the work request is accompanied by an account identifier; and a system for creating a second account record for the work request in response to completion of the set of jobs by the virtual machine, wherein the second account record indicates the CPU utilization for the virtual machine to complete the set of jobs.

A fourth aspect of the present invention provides a program product stored on a computer useable medium for capturing Central Processing Unit (CPU) utilization for a virtual machine, the computer useable medium comprising program code for causing a computer system to perform the following steps: issuing a first script in response to a work request having a set of jobs received by the virtual machine from a host; creating a first account record for the work request in response to the first script; issuing a second script in response to completion of the set of jobs in the virtual machine; and creating a second account record for the work request in response to the second script, wherein the second account record indicates the CPU utilization for the virtual machine to complete the set of jobs.

A fifth aspect of the present invention provides a method for deploying an application for capturing Central Processing Unit (CPU) utilization for a virtual machine, comprising: providing a computer infrastructure being operable to: issue a first script in response to a work request having a set of jobs received by the virtual machine from a host; create a first account record for the work request in response to the first script; issue a second script in response to completion of the set of jobs in the virtual machine; and create a second account record for the work request in response to the second script, wherein the second account record indicates the CPU utilization for the virtual machine to complete the set of jobs.

A sixth aspect of the present invention provides computer software embodied in a propagated signal for capturing Central Processing Unit (CPU) utilization for a virtual machine, the propagated signal comprising instructions for causing a computer system to perform the following functions: issuing a first script in response to a work request having a set of jobs received by the virtual machine from a host; creating a first account record for the work request in response to the first script; issuing a second script in response to completion of the set of jobs in the virtual machine; and creating a second account record for the work request in response to the second script, wherein the second account record indicates the CPU utilization for the virtual machine to complete the set of jobs.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 shows an illustrative table of account records according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the present invention provides a method, system and program product for capturing CPU utilization for a virtual machine (VM) from a perspective of a host. Specifically, under the present invention, a work request having a set (e.g., one or more) of jobs is received by a host and allocated to a virtual machine on a node. The work request is typically accompanied by an account identifier such as a multi-value billing code. Once the work request is allocated to a particular VM on the node, a "startacct" script is issued, and a first account record is created. Thereafter, the work request is processed and the CPU utilization needed to complete the set of jobs is monitored. Once the set of jobs is completed, an "endacct" script is issued and a second account record is created. Among other things, the second account record includes the monitored CPU utilization and the account identifier accompanying the work request.

Figure 1:
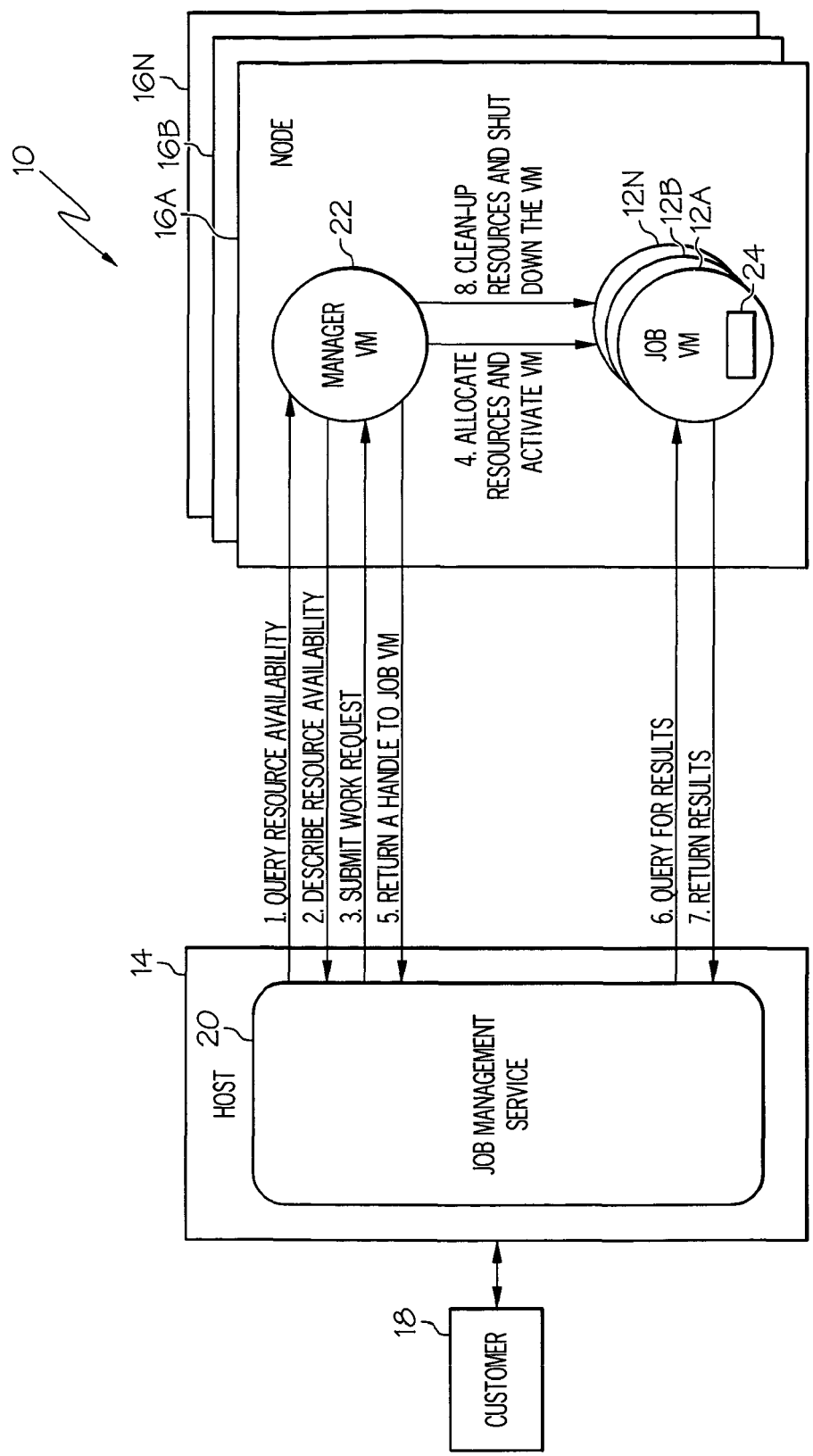
FIG. 1 shows a system for capturing CPU utilization of a virtual machine according to the present invention.

Referring now to FIG. 1, a system 10 for monitoring CPU utilization for a VM 12A from a perspective of a host 14 according to the present invention is show. Specifically, FIG. 1 shows host 14 in communication with nodes 16A-N. Further, each node 16A-N typically includes a manager VM 22 as well as one or more "job" VMs 12A-N. In a typical embodiment, system 10 is implemented using LINUX technology. However, this need not be the case. In any event, under the present invention, each node 16A-N includes a resource monitoring system 24, which is shown incorporated within each VM 12A-N. It should be appreciated, however, that resource monitoring system 24 could exist external to VMs 12A-N, and even external to nodes 16A-N. A primary function of resource monitoring system 24 is to monitor resource usage such as CPU utilization for a VM in real time from a perspective of host 14 as the VM processes a work request from a user or customer 18.

In an illustrative example, assume that customer 18 is submitting a work request that includes a set (e.g., one or more) of jobs to host 14. The work request will be received by job management service 20 within host 14 and then sent to a particular node (e.g., node 16A). Specifically, job management service 20 will query the manager VMs 22 of nodes 16A-N to determine which node has the best resource availability. Based on the responses, job management service 20 will submit the work request to a particular node, which in this example can be assumed to be node 16A. Under the present invention, job management service 20 will send the work request to node 16A along with an account identifier. In a typical embodiment, the account identifier is a multi-value (e.g., eight character) billing code or the like that allows the work request to be associated with customer 18. The account identifier can also identify the particular jobs that are being performed pursuant to the work request. These pieces of information would allow the work request to be properly attributed and/or billed to customer 18.

The work request and account identifier will be received by manager VM 22 of node 12A, which will allocate resources and activate a particular "job" VM 12A to process the work request. Similar to the selection of a particular node, the selection of VM 12A can be based on a resource availability of VM 12A. In response, resource monitoring system 24 will issue a "startacct" script before the work request is processed. In a typical embodiment, the script issues a "Diagnose 4C" subcode 04 with the account identifier passed in the work request. In response, resource monitoring system 24 will create a first account record in a table.

Referring to FIG. 2, a table 50 as created under the present invention is shown in greater detail. Specifically, as shown, table 50 includes account records 52A-D. Account records 52A-B pertain to a first work request, while account records 52C-D pertain to a second work request. As can be seen, each account record 52A-D includes a user identification, an account identification, a date/time stamp, a CPU utilization, and a record type.

Assume in this example that account records 52A-B pertain to the work request received from customer 18 of FIG. 1. Pursuant to the issuance of "startacct" script, resource monitoring system 24 (FIG. 1) will create record 52A, and populate the same with data such as that shown. The user identification pertains to node 16A (FIG. 1) that received the work request from host 14 (FIG. 1). Since the work request has not yet been processed, the account identification will be set to a default value. The date/time stamp indicates that the account record 52A was created, or the work request was received by VM 12A, on Nov. 25, 2004 at 8:00:22 AM. The CPU utilization value shown in account record 52A represents a background or overhead level of CPU utilization before the work request is processed. Furthermore, the record type for account record 52A is reflected as being "01". This record type can indicate any number of items such as that the work request has not yet been processed, that account record 52A was created pursuant to the "startacct" script being issued, etc.

In any event, at this point VM 12A (FIG. 1) will begin to process the work request. In processing the work request VM 12A will complete all jobs defined therein. As this is occurring, resource utilization such as CPU utilization for VM 12A will be monitored. This can be performed by resource monitoring system 24, or by another independent system not shown. Once all jobs are complete, resource monitoring system 24 (FIG. 1) will issue an "endacct" script. In a typical embodiment, the "endacct" script issues a Diagnose 4C subcode 04 with no data. In response, resource monitoring system 24 will create account record 52B and populate the same with data such as that shown in FIG. 2. As shown, the user identification represents node 16A similar to account record 52A. However, in this case, the account identifier is distinct. That is, the account identification for account record 52B is set to the account identifier that accompanied the work request. This will allow any CPU utilization to be attributed properly. As further shown, the date time stamp indicates that all jobs were complete as of Nov. 25, 2004 at 8:01:30 AM. As further shown, the CPU utilization was 6,345,036 microseconds, and the record type is "C1", which can indicate a completion of the jobs, an issuance of the "endacct" script, etc. Once account record 52B is populated, the account identification will be reset to the default value, which is shown in account record 52C, and which denotes the receipt of a new work request. This new work request will be handled as described above, namely: assignment to a VM; issuance of the "startacct" script; creation and population of entry 52C; processing of the new work request and monitoring of resource utilization; issuance of the "endacct" script; and creation and population of account record 52D.

Once the process is complete, resource monitoring system 24 can output table 50 or a report of the same. The information contained within table 50 can be used to properly track and account the work request to customer 18. As shown in FIG. 1, host 14 can query VM 12A for the results.

Figure 3:
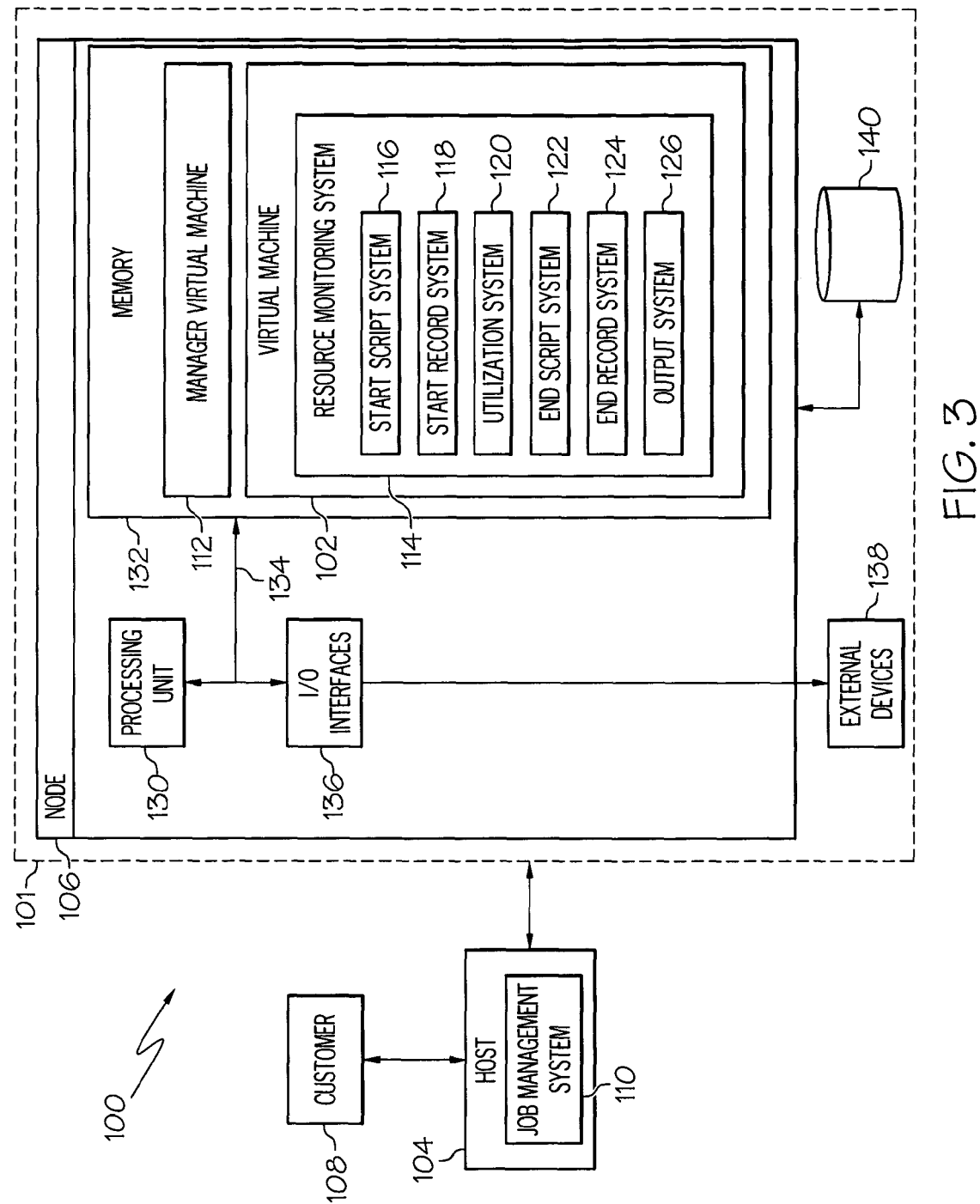
FIG. 3 shows computerized implementation according to the present invention.

Referring now to FIG. 3, a computerized implementation 100 of the present invention is shown. Specifically, FIG. 3 depicts a node 106 deployed within a computer infrastructure 101. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 101 is intended to demonstrate that some or all of the components of implementation 100 could be deployed, managed, serviced, etc. by a service provider who offers to evaluate annotations.

It should be understood that computer infrastructure 101 can include multiple nodes 106, such as shown in FIG. 1. Such other nodes have not been shown in FIG. 3 for brevity purposes. In any event, as shown, node 106 includes a processing unit 130, a memory 132, a bus 134, and input/output (I/O) interfaces 136. Further, node 106 is shown in communication with external I/O devices/resources 138 and storage system 140. In general, processing unit 130 executes computer program code, such as resource monitoring system 114, which is stored in memory 132 and/or storage system 140. While executing computer program code, processing unit 130 can read and/or write data to/from memory 132, storage system 140, and/or I/O interfaces 136. Bus 134 provides a communication link between each of the components in node 106. External devices 138 can comprise any devices (e.g., keyboard, pointing device, display, etc.) that enable a user to interact with node 106 and/or any devices (e.g., network card, modem, etc.) that enable node 106 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, node 106 is only representative of various possible computer systems that can include numerous combinations of hardware. To this extent, in other embodiments, node 106 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 130 may comprise a single processing unit, or be distributed across one or more processing units in one or more locations, e.g., on a client and server. Similarly, memory 132 and/or storage system 140 can comprise any combination of various types of data storage and/or transmission media that reside at one or more physical locations. Further, I/O interfaces 136 can comprise any system for exchanging information with one or more external devices 138. Still further, it is understood that one or more additional components (e.g., system software, math co-processing unit, etc.) not shown in FIG. 3 can be included in node 106. However, if node 106 comprises a handheld device or the like, it is understood that one or more external devices 138 (e.g., a display) and/or storage system(s) 140 could be contained within node 106, not externally as shown.

Storage system 140 can be any type of system (e.g., a database) capable of providing storage for information under the present invention such as work requests, resource usage data, table 50 of FIG. 2, etc. To this extent, storage system 140 could include one or more storage devices, such as a magnetic disk drive or an optical disk drive. In another embodiment, storage system 140 includes data distributed across, for example, a local area network (LAN), wide area network (WAN) or a storage area network (SAN) (not shown). Although not shown, additional components, such as cache memory, communication systems, system software, etc., may be incorporated into node 106.

Shown in memory 132 of node 106 is manager VM 112 and "work" VM 102, which contains resource monitoring system 114 (shown as a computer program product). Similar to node 106, a single VM 102 is shown for brevity purposes. As further depicted, resource monitoring system 114 includes start script system 116, start record system 118, utilization system 120, end script system 122, end record system 124, and output system 126. These systems carry out the teachings of the present invention as described above.

Specifically, as a work request is received by host 104 from customer 108, it will be sent to node 106 by job management system 110. As indicated above, the work request is sent with a corresponding account identifier. Upon receipt, the work request will be sent to VM 102 by manager VM 112. In response, start script system 116 will issue the "startacct" scrip, and start record system 118 will create a first account record in a table and populate the same with data as described above. Thereafter, VM 102 will process the work request by performing the one or more jobs contained therein. As this is occurring, resource utilization (e.g., CPU utilization) will be monitored (e.g., by utilization system 120 or another system external to resource monitoring system 114 not shown in FIG. 3). Once all jobs in the work request are complete, end script system 122 will issue an "end script", and end record system 124 will create a second record in the table. As described above, this second account record will include, among other things, the account identifier that accompanied the work request as well as the resource utilization for completing the jobs in the work request. When the process is complete, output system 126 can output the information and/or the table itself to host 104 or another location.

Figure 4:
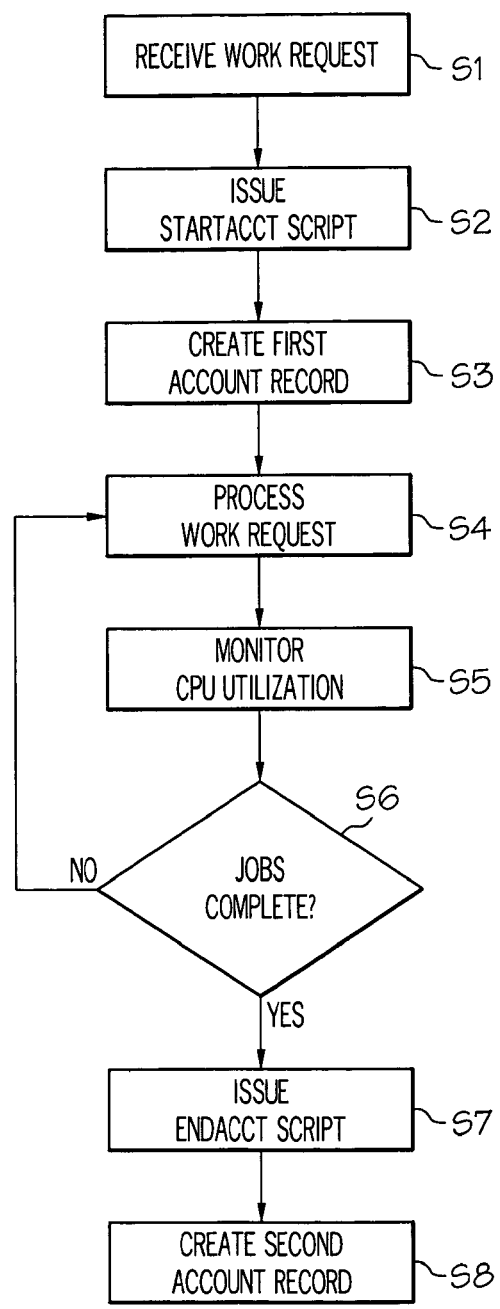
FIG. 4 shows a method flow diagram according to the present invention.

Referring to FIG. 4, a method flow diagram according to the present invention is shown. As depicted, a work request is received by the VM in step S1. In step S2, the "startacct" script is issued. In step S3, a first account record is created and populated. Then, in step S4, the processing of the work request is commenced. As the processing is occurring, CPU utilization is monitored/captured in step S5. In step S6, it is determined whether all jobs are complete. If not, the process returns to step S4. Once all jobs are complete, an "endacct" script will be issued in step S7, and a second account record will be created and populated in step S8.

Illustrative Implementations:

In various illustrative embodiments, several implementation of the present invention are possible. Three such implementations are set forth below:

Implementation 1: Boot a Linux Server to Perform One or More Jobs, Followed by a Shutdown of the Linux Server.
(1) A master server receives work request, determines which available Linux server it should run on, and boots the available Linux server;
(2) After bootup, either the master runs the job(s) on the booted server (e.g., via SSH), or the job(s) is executed automatically by the booted server after bootup;
(3) After the job(s) is run, the master server shuts down the booted server, or shutdown is invoked automatically as part of job(s) completion;
(4) VM accounting records are created automatically when a VM user logs off, so CPU utilization will be captured;
(5) Accounting records are matched up with times from the master job log to determine how much CPU was used for each job; and
(6) The CPU can be normalized "manually" based on results from above.

Implementation 2: Leave the Linux Servers Running, and have the Master Server Ensure that Accounting Records are Created at Job Start and Stop.
(1) The master server receives the work request, determines which available Linux server it should run on, and issues "HCPACNT CLOSE <linux_server>" (where linux_server is the available server the job(s) will run on). This will cause an accounting record to be created for the available server that shows any time used up to this point;
(2) The job(s) is executed on the Linux server;
(3) At completion of the job(s), "hcp ACNT CLOSE <linux_server>" is issued again by the master server. This will create an accounting record that would contain the CPU utilization for the job(s);
(4) Accounting records are matched up with times from the master job log to determine how much CPU was used for each job—there should be a discreet accounting record for each job, as well as other account records which are "overhead" (not assigned to a job); and
(5) The CPU can be normalized "manually" based on results from above.

Implementation 3: Leave Linux Servers Running, and have each Linux Server Create Accounting Records at Job Start and Stop.
(1) The master server receives work request, determines which available Linux server it should run on, and the initiates job(s) on server, passing the correct billing code for the job(s);
(2) The available Linux server accepts job, and uses Diag 4C (possible via cpint package) to create an accounting record at job(s) start, and to set the VM user account code to the proper billing code. (OPTION ACCT is needed in the Linux server directory to allow use of Diag 4C); and
(3) At job completion, Diag 4C is issued to create an accounting record which will contain the CPU utilization for the job(s).

While shown and described herein as a method, system and program product for capturing CPU utilization for a virtual machine, it is understood that the invention further provides various alternative embodiments. For example, in one embodiment, the invention provides a computer-readable medium (or computer useable medium) that includes computer program code to enable a computer infrastructure to capture CPU utilization for a virtual machine. To this extent, the computer-readable medium or computer useable medium includes program code that implements each of the various process steps of the invention. It is understood that the term "computer-readable medium" or "computer useable medium" comprises one or more of any type of physical embodiment of the program code. In particular, the or computer-readable medium or computer useable medium can comprise program code embodied on one or more portable storage articles of manufacture (e.g., a compact disc, a magnetic disk, a tape, etc.), on one or more data storage portions of a computing device, such as memory 132 (FIG. 3) and/or storage system 140 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to capture CPU utilization for a virtual machine. In this case, the service provider can create, maintain, support, etc., a computer infrastructure, such as computer infrastructure 101 (FIG. 3) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for capturing CPU utilization for a virtual machine. In this case, a computer infrastructure, such as computer infrastructure 101 (FIG. 3), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as node 106 (FIGS. 1 and 3), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for capturing Central Processing Unit (CPU) utilization of a job virtual machine from a perspective of a host, wherein the host is in communication with a plurality of nodes, and each node includes a manager virtual machine and one or more job virtual machines, comprising:
querying, by a job management service on the host, a plurality of manager virtual machines to select the node that has the best resource availability;
receiving, by the manager virtual machine of the selected node, a work request, having a set of jobs, from the job management service, wherein the work request is accompanied by an account identifier assigned by the host;
activating, by the manager virtual machine of the selected node, a job virtual machine of the selected node based on resource availability of the one or more job virtual machines of the selected node, to process the work request;
creating, at the activated job virtual machine, a first account record for the work request in response to a first script with the account identifier being issued, the first account record including an indicator of a beginning of the work request and the account identifier;
monitoring, at the activated job virtual machine, in response to the creating of the first account record, the CPU utilization of the processing of the set of jobs in the activated job virtual machine; and
creating, at the activated job virtual machine, a second account record for the work request in response to a completion of the set of jobs and a second script without data being issued, the second account record including the CPU utilization for the activated job virtual machine to process the set of jobs, an indicator of an end of the work request, and the account identifier.

2. The method of claim 1, wherein an account identification within the first account record is set to a default value, and wherein an account identification within the second account record is set to the account identifier.

3. The method of claim 1, wherein the first account record and the second account record each comprise a user identification, an account identification, a date/time stamp, a CPU utilization, and a record type.

4. The method of claim 3, wherein the record type within the first account record is distinct from the record type within the second account record.

5. The method of claim 3, wherein the user identification identifies a name of the activated job virtual machine.

6. The method of claim 1, wherein the CPU utilization is captured in real-time in the second account record.

7. A method for capturing Central Processing Unit (CPU) utilization of a job virtual machine from a perspective of a host, wherein the host is in communication with a plurality of nodes, and each node includes a manager virtual machine and one or more job virtual machines, comprising:
querying, by a job management service on the host, a plurality of manager virtual machines to select the node that has the best resource availability;
receiving, by the manager virtual machine of the selected node, a work request, having a set of jobs, from the job management service, wherein the work request is accompanied by an account identifier assigned by the host;
activating, by the manager virtual machine of the selected node, a job virtual machine of the selected node based on resource availability of the one or more job virtual machines of the selected node, to process the work request;
creating, at the activated job virtual machine, a first account record for the work request in response to a first script with the account identifier being issued, the first account record including an indicator of a beginning of the work request and the account identifier;
monitoring, at the activated job virtual machine, in response to the creating of the first account record, the CPU utilization of the processing of the set of jobs in the activated job virtual machine; and
creating, at the activated job virtual machine, a second account record for the work request in response to a completion of the set of jobs and a second script without data being issued, the second account record including the CPU utilization for the activated job virtual machine to process the set of jobs, an indicator of an end of the work request, and the account identifier.

8. The system of claim 7, wherein an account identification within the first account record is set to a default value, and wherein an account identification within the second account record is set to the account identifier.

9. The system of claim 7, wherein the first account record and the second account record each comprise a user identification, an account identification, a date/time stamp, a CPU utilization, and a record type.

10. The system of claim 9, wherein the record type within the first account record is distinct from the record type within the second account record.

11. The system of claim 9, wherein the user identification identifies a name of the activated job virtual machine.

12. The system of claim 7, wherein the CPU utilization is captured in real-time in the second account record.

13. A non-transitory computer readable storage device that has a computer program product stored thereon for capturing Central Processing Unit (CPU) utilization of a job virtual machine from a perspective of a host, wherein the host is in communication with a plurality of nodes, each node includes a manager virtual machine and one or more job virtual machines, and the host when executed by a computer device, performs a method comprising:
querying, by a job management service on the host, a plurality of manager virtual machines to select the node that has the best resource availability;
receiving, by the manager virtual machine of the selected node, a work request, having a set of jobs, from the job management service, wherein the work request is accompanied by an account identifier assigned by the host;
activating, by the manager virtual machine of the selected node, a job virtual machine of the selected node based on resource availability of the one or more job virtual machines of the selected node, to process the work request;
creating, at the activated job virtual machine, a first account record for the work request in response to a first script with the account identifier being issued, the first account record including an indicator of a beginning of the work request and the account identifier;

monitoring, at the activated job virtual machine, in response to the creating of the first account record, the CPU utilization of the processing of the set of jobs in the activated job virtual machine; and creating, at the activated job virtual machine, a second account record for the work request in response to a completion of the set of jobs and a second script without data being issued, the second account record including the CPU utilization for the activated job virtual machine to process the set of jobs, an indicator of an end of the work request, and the account identifier.

14. The method of claim 13, wherein an account identification within the first account record is set to a default value, and wherein an account identification within the second account record is set to the account identifier.

15. The method of claim 13, wherein the first account record and the second account record each comprise a user identification, an account identification, a date/time stamp, a CPU utilization, and a record type.

16. The method of claim 15, wherein the record type within the first account record is distinct from the record type within the second account record.

17. The method of claim 15, wherein the user identification identifies a name of the activated job virtual machine.

* * * * *